Patented Sept. 1, 1953

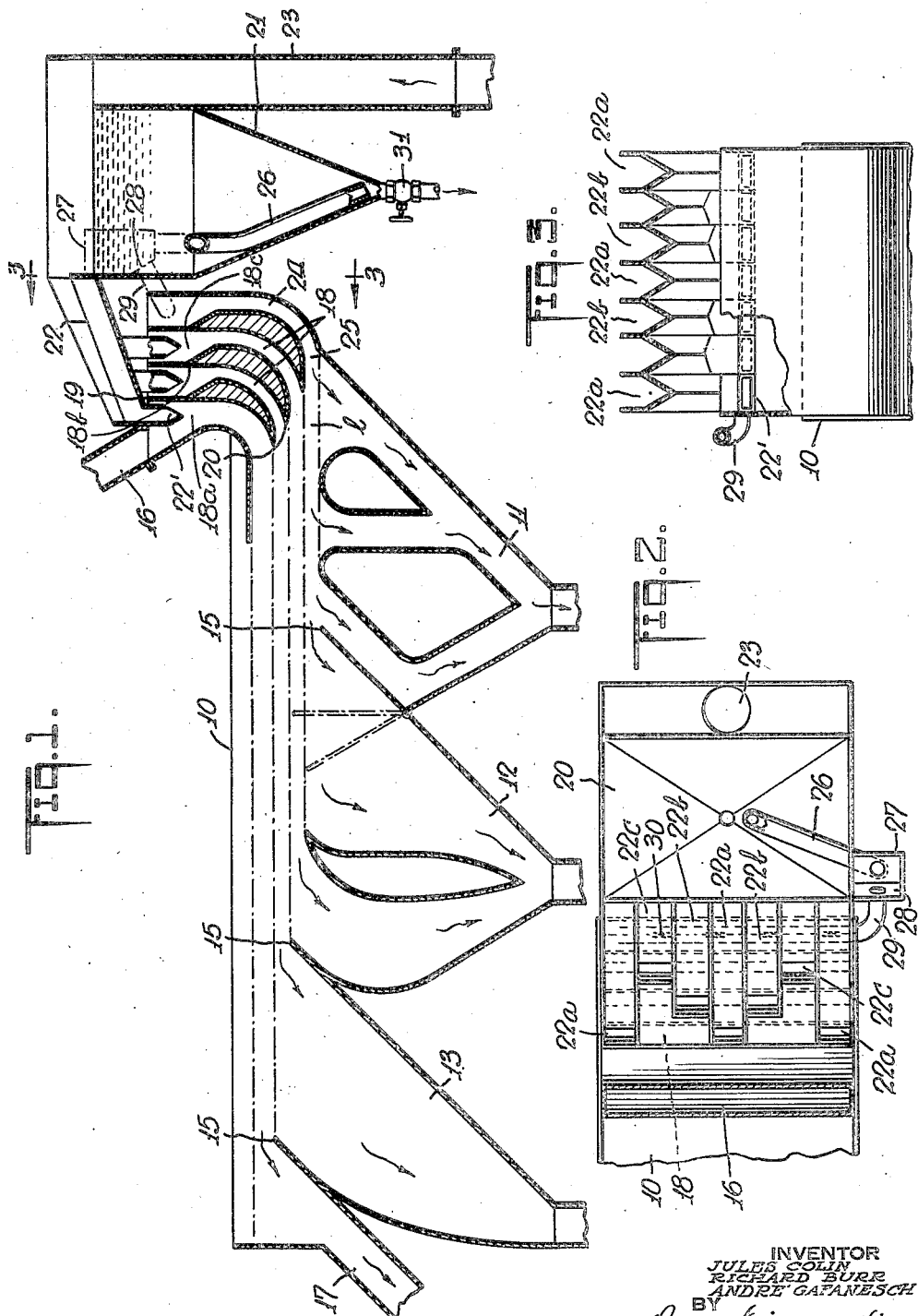

2,650,706

UNITED STATES PATENT OFFICE 2,650,706

METHOD AND APPARATUS FOR SEPARATING SOLID PARTICLES

Jules Colin, Richard Burr, and André Gafanesch, Mulhouse, Haut-Rhin, France, assignors to Mines Domaniales de Potasse d'Alsace, Mulhouse, Haut-Rhin, France, a corporation of France Application February 18, 1948, Serial No. 9,116
In France February 21, 1947

9 Claims. (Cl. 209—173)

While the present invention is not entirely limited thereto, it has its preferred application as an improvement to the subject matter of our earlier application Serial No. 735,568, filed March 19, 1947, since issued on March 25, 1952, as Patent No. 2,590,756.

The present invention is more especially concerned with methods and means for introducing into a separating tank, both the separating liquor and the heavier screening layer of liquor therebelow, by which screening layer is minimized the gravity entrainment of lighter particles with the heavier particles that are to gravitate out.

It is among the objects of the invention to provide a method and equipment for the above purpose which shall be simple, rugged and reliable in action and by which separating liquor, previously combined with the heavier non-soluble particles that make up the screening layer, is automatically separated into fractions of separating liquor and screening liquor, preparatory to delivery of the same to the separating tank and in which the delivery of both separating liquid and screening layer is reliable and uniform even where a very wide tank is used and such operation occurs with a minimum of agitation or eddy currents that might impair the efficacy of separation.

Like the invention of our prior application above identified, the present invention is especially useful when the main components to be separated have nearly the same density, and it has particular utility for the separation of the ore known as "sylvinite," especially sylvinite of the character obtained from the potassium mines of Mulhouse in France.

In the accompanying drawings in which is shown one of various possible embodiments of the several features of the invention, Fig. 1 is a diagrammatic sectional view illustrating the novel equipment of the invention by which the method herein claimed is carried out, Fig. 2 is a plan view of said equipment, and Fig. 3 is a transverse sectional view taken on line 3—3 of Fig. 1.

The equipment and method in its general outline need be but briefly described since that is the subject matter of our patent above identified. It may be noted briefly that that system comprises in its essence an elongated separating tank 10 equipped with a sequence of sumps, such as 11, 12 and 13, each sump having a weir wall 15 at the far end thereof, the weir walls being at progressively higher levels for peeling off, as it were, various layers of liquor with the entrained particles to be separated that have been laid upon the top of the separating liquor from a conveyor 16. The lightest fraction floating on top of the separating liquor discharges through outlet conduit 17 at the far end of the tank. The tank also has an inlet for delivering thereto the layer of screening liquor 1 near the bottom thereof which underlies the separating liquor. Further details of the general system need not be described for purposes of the present invention.

According to the present invention, the inlet end wall of the separating tank 10 has a special conformation by which both the separating liquor and the screening liquor thereunder are introduced by pouring the same downward but directing the inflow to enter the tank horizontally at the desired level. For this purpose, the near end wall of the tank is formed preferably in a plurality of channel structures 18, each channel structure extending downward from its open inlet 19 and being curved to discharge horizontally forward at its outlet or nozzle 20 at the desired level.

The channel nozzles in the tank wall extend across the entire width of said tank in side by side relation, as shown. The channels are uniformly curved forwardly, as shown, and their nozzle ends 20 are arranged, as shown, to empty at progressively higher levels into tank 10, each extending inward longitudinally of the tank slightly forward with respect to the previous nozzle and all nozzles discharging into the tank horizontally forward. Thus if the liquor is poured into the upper or inlet ends 19 of the various channels concurrently, it will be laid down uniformly in the separating tank in the desired manner with a minimum of agitation or eddy currents.

According to the invention, the separating liquor is introduced into the separating tank, the discharge of which is dammed, preferably by overflow over a weir near the top of a settling tank 21 of height considerably greater than that of the separating tank and disposed desirably near the near or inlet end of the latter. This settling tank has an overflow conduit structure, desirably a series of gutters 22 discharging the overflow from the weir downward through spouts 22' into the respective channels 18, the upper ends of which are directly below the corresponding spouts, as shown. Thus, separating liquor admitted to the settling tank 21 through supply pipe 23 will overflow from said settling tank in the desired manner to the separating tank to maintain the bath therein at the desired level.

To introduce the liquor from tank 21 with a minimum of agitation and a minimum of eddy currents, even where the tank is of considerable width, the gutters 22 are distributed across to occupy the entire width of said tank, there being illustratively, as shown in the drawings, seven such gutters, although a greater or lesser number may be used if desired. As illustratively shown, the innermost group of longest gutters 22a, that discharge into channel 18a, may be three in number, desirably arranged as the outer two and the middle of seven gutters in side by side relation, the gutters 22b that discharge into channel 18b are two in number, desirably adjacent to opposite sides of middle gutter 22a, and finally the shortest gutters 22c that discharge into channel 18c are two in number intervening between the outer gutters 22a and the respective neighboring gutters 22b. Thus the discharge from each of the gutters 22 to the corresponding channel 18 is spaced both transversely and longitudinally of the tank from that through each neighboring gutter, so that the likelihood of turbulence or eddy currents is minimized.

The screening liquor also is delivered to the separating tank 10 from the settling tank 21. To this end, the liquor which has come through pipe 23 into the tank 21 comprises a liquid which contains a suspension of minute particles of a heavier insoluble substance such as magnetite. This mixture of liquid and minute solid particles which has been admitted into the settling tank 21 will settle partially so that the lower fraction in said settling tank will contain a higher proportion of magnetite than the upper fraction. This lower fraction will constitute the screening liquor.

According to the structure shown, the screening liquor is taken from the lower part of the settling tank 21 and is admitted to the separating tank 10 through a channel 24, desirably at the extreme end of the separating tank 10, as shown, said channel being curved in the same manner as the channels 18 for the separating liquor and also extending the entire width of the separating tank and discharging horizontally as through nozzle 25 at the desired level below the separating liquor and near the bottom of the separating tank.

While the heavier fraction from near the bottom of the settling tank 21 may be delivered into the channel 24 on the separating tank in other ways, the particular construction shown is advantageous. For this purpose, a pipe 26 extending obliquely upward from the bottom of the settling tank 21 empties at its upper end into a small chamber comprising a closed box 27 mounted at the upper part of the settling tank 21. From the desirably oblique side wall 28 at the lower corner of said box, a discharge pipe 29 extends outward across the upper end of the screening liquor channel 24, said pipe having slotted ports 30 distributed along the length thereof for uniformity of discharge into the channel 24.

It will be understood that the method of operation is not limited to the use of the particular equipment described for its execution. In now briefly summarizing the operation, it will therefore be understood that the method thereof could be carried out by other equipment.

In carrying out the invention, the separating liquor is first admixed with appropriate proportions of insoluble particles of magnetite or the like to obtain a liquor the density of which will permit an efficient separation of the mineral ore admitted into the separating tank 10 through conveyor 16. That liquor with its admixed particles is pumped through feed pipe 23 into settling tank 21 where the liquor settles, the fraction carrying the preponderance of the heavier particles settling near the inverted apex of the desirably conical bottom of said tank. The lighter liquor at the top of the settling tank, which contains less magnetite or other heavier particles, overflows past the weir formed by the edges at the upper ends of the gutters 22, thence through the length thereof to escape therefrom through the spouts 22' thereof into the respective channels 18 of the separating tank to be delivered therefrom horizontally forward into tank 10 with distribution along the entire width and height of the bath and with a minimum of agitation and eddy currents. At the same time, the heavier liquor, with its preponderance of magnetite or like particles, is fed from the bottom of the settling tank 21 upward through pipe 26 into box 27 from which it passes out by way of transverse pipe 29 and ports 30 to fall therefrom into and along the width of the extreme screening channel 24 from which said liquor flows forward to form the lower or screening layer 1 below the separating layer.

By resort to a valve 31 at the bottom of the settling tank, the density of the lower or heavier fraction may be varied, depending upon requirements.

It will be seen that the separating liquor and the heavier screening liquor are fed into the shallow tank each at a substantially constant and substantially invariant head with resultant uniformity of feed.

Thus by the present invention, the method of our prior application above identified is facilitated and its reliability enhanced, and the equipment is improved.

As many changes could be made in the above method and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention what we claim as new and desire to secure by Letters Patent of the United States is:

1. In the art of gravity separation of particles differing little in density, in which the particles are deposited upon a bath having specific gravity intermediate between the particles, in which fractions are passed off from different levels in the bath, and in which a screen of heavier particles across the lower part of the bath bars downward entrainment of lighter particles; that method in which the heavier or screen particles are admixed with the separating liquor and in which the liquor bearing such particles is permitted to settle to level below the bottom of the bath prior to its introduction into the bath for segregation into a heavier fraction at the bottom containing a preponderance of the heavier particles, and a lighter fraction thereabove, the damming of the lighter fraction for overflow thereof from above the top of the bath and in which such heavier fraction is introduced to the bath from near the bottom of the settled liquor upwardly to above the top of the bath, thence downwardly in a forwardly curved course for delivery horizontally into the bath in a layer near the bottom thereof to form the screen, and the lighter fraction is introduced from the overflow and distributed laterally across the tank and admitted in a plurality of downwardly thence forward curved courses into the tank in layers above the bottom layer, whereby each of the fractions of the separating liquor is delivered to the bath with a substantially invariant head.

2. In the art of gravity separation of particles differing little in density, in which the particles are deposited upon a bath of intermediate density and in which fractions of different density are passed off at different levels through the bottom of the bath, and in which a screen of heavier particles across the lower part of the bath bars loss of entrained lighter particles; that method in which the separating liquor and the screening particles are admixed, in which the admixed liquor is permitted to settle to level below the bottom of the bath prior to its introduction into the bath, for segregation of a preponderance of the heavier particles in a heavier fraction at the bottom and a lighter bath liquor fraction at the top, in which the lighter fraction is dammed for overflow thereof from above the top of the bath and such heavier fraction is passed upward from near the bottom of the liquor to above the top of the bath, thence in a downward and forwardly curved course for delivery of a layer directed horizontally into the bath near the bottom thereof and the overflow of the lighter fraction is admitted in a downward thence forwardly curved path horizontally into the bath at level above the screening fraction through a plurality of channels whose discharge into the bath is distributed across the width and at diverse levels of the bath, whereby each of the fractions of the separating liquor is delivered to the bath with a substantially invariant head.

3. Separating equipment comprising an elongated shallow tank for a separating bath, means for depositing the particles to be separated upon the surface of the separating bath in said tank, means for introducing liquor for the separating bath and at the same time introducing a screening layer of higher density horizontally into the tank near the bottom thereof beneath the separating layer, said last named means comprising a settling tank having its bottom well below the bottom of the shallow tank and its top well above the bath in the shallow tank and serving for the separating liquor admixed with heavier particles in suspension for settling thereof into a heavier fraction with a preponderance of the heavier particles near the bottom thereof and a lighter fraction thereabove, said settling tank having a plurality of overflow gutters extending from near the top thereof, the edges of said gutters nearest said tank determining a weir for overflow of the lighter fraction into said gutters and downwardly and forwardly along said gutters, channels extending into said tank from the respective forward ends of said gutters and having nozzles opening horizontally into the tank, and a conduit extending upward from near the bottom of the settling tank to above the top of the shallow tank, and a channel communicating with said conduit and curved downward and forwardly into said shallow tank with a nozzle opening directed horizontally into the said latter tank near the bottom thereof.

4. Separating equipment comprising a separating tank with liquor of density between that of the particles to be separated, a sequence of sumps lengthwise of the tank through which fractions of the liquor from diverse levels are selectively withdrawn with their entrained particles, a settling tank having its bottom well below the bottom of the separating tank and its top well above the bath in the separating tank, said settling tank connecting with the inlet end of the separating tank, said settling tank having a weir and an overflow gutter from the top leading downwardly and forwardly therefrom to supply the separating tank with a lighter fraction of the liquor from an admixture of the liquor, a conduit extending upward from near the bottom of the settling tank to above the top of the separating tank for delivery of the heavier settled fraction into the separating tank, and a downwardly and forwardly curved channel delivering from said conduit to near the bottom of the separating tank and discharging horizontally thereinto.

5. Separating equipment comprising a shallow separating tank for separating liquor, means for depositing the particles to be separated upon the top of the bath, a sequence of sumps lengthwise of the tank for removal of liquor from diverse levels with their entrained segregated particles, a settling tank having its bottom well below the bottom of the separating tank and its top well above that of the bath in the separating tank, means for introducing into said tank an admixture of separating liquor and particles for a screening liquor that serves to hinder the entrainment of lighter particles with the heavier particles, a weir at the upper part of said settling tank, a plurality of generally parallel conduits conveying overflow from said weir, a plurality of downwardly extending channels intercepting the discharge from the respective conduits, said channels being curved forwardly and downwardly and having nozzles opening horizontally into the separating tank near one end thereof, conduit means communicating with the lower part of the settling tank and extending to above the top of the separating tank for delivery of the heavier screening liquor therefrom, and including a channel extending downwardly and curved forwardly and having a nozzle opening horizontally into the separating tank at a level below said first nozzles.

6. Separating equipment of the character described comprising an elongated separating tank having near one end thereof a series of upright channels distributed over the entire end wall of said tank, said channels having nozzles opening forward horizontally into the tank, the widths of said nozzles substantially occupying the entire width of the tank, a settling tank adjacent said end of the separating tank having its bottom well below the bottom of the separating tank and its top well above that of the bath in the separating tank, said settling tank having a weir near the top thereof and overflow gutters feeding separating liquor downward into the respective channels, said settling tank having an outlet pipe from the lower part thereof extending upwardly to above the top of the separating tank, a discharge conduit from the latter, and additional channel means on the extremity of the separating tank having a nozzle opening forward horizontally into the separating tank below said first named nozzles to deliver the discharge from said conduit horizontally under the separating liquor therein along the lower part of said separating tank.

7. Separating equipment comprising a shallow separating tank for separating liquor, means for depositing the particles to be separated upon the top of the liquor in the tank, a sequence of sumps lengthwise of the tank for removal of liquor from diverse levels with their entrained segregated particles, a settling tank having its bottom well below the bottom of the separating tank and its top well above that of the bath in the separating tank, means for introducing into said settling tank an admixture of separating liquor and particles for a heavier screening liquor that serves to hinder the entrainment of lighter particles with the heavier ones into the sump, said settling tank at the upper part thereof having a weir and a plurality of gutters with downwardly opening outlets, said outlets being distributed across the inlet end of said separating tank, channel means intercepting the discharge from said gutters, said channel means having inlets directly below said outlets, said channels extending downward along the end of the separating tank and having nozzles opening horizontally into one end of the separating tank to feed the liquor from the top of said settling tank into the separating tank horizontally therethrough, an additional channel on said separating tank having a nozzle opening horizontally into said separating tank below the nozzles of said first named channels, and conduit means communicating with the lower part of the settling tank to above the top of the separating tank for delivery of the heavier screening liquor therefrom, said conduit feeding said screening liquor into said additional channel.

8. The combination set forth in claim 7 in which said additional channel extends across the entire width of said separating tank and said conduit includes a pipe transversely of the separating tank, said pipe having ports distributed along the length thereof and discharging into the upper portion of said additional channel.

9. The combination set forth in claim 7 in which a pipe extends transversely of the separating tank above said additional channel, a chamber accommodates the inlet end of said pipe, said chamber being disposed near the upper part of the settling tank.

JULES COLIN.
RICHARD BURR.
ANDRÉ GAFANESCH.

References Cited in the file of this patent

UNITED STATES PATENTS

| Number | Name | Date |
|---|---|---|
| 206,115 | Jebb | July 16, 1878 |
| 2,209,618 | Vogel | July 30, 1940 |
| 2,262,465 | Olney | Nov. 11, 1941 |
| 2,365,734 | Tromp | Dec. 26, 1944 |
| 2,458,035 | Tromp | Jan. 4, 1949 |
| 2,482,747 | Davis et al. | Sept. 27, 1949 |

FOREIGN PATENTS

| Number | Country | Date |
|---|---|---|
| 504,772 | Great Britain | May 1, 1939 |